(12) United States Patent
Greenblatt

(10) Patent No.: US 11,731,718 B2
(45) Date of Patent: *Aug. 22, 2023

(54) SCOOTER RACK

(71) Applicant: Everlast Climbing Industries, Inc., Minneapolis, MN (US)

(72) Inventor: Joel Greenblatt, Golden Valley, MN (US)

(73) Assignee: EVERLAST CLIMBING INDUSTRIES, INC., Crystal, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/479,574

(22) Filed: Sep. 20, 2021

(65) Prior Publication Data
US 2022/0001945 A1 Jan. 6, 2022

Related U.S. Application Data

(63) Continuation of application No. 17/032,896, filed on Sep. 25, 2020, now Pat. No. 11,148,740.

(60) Provisional application No. 62/907,263, filed on Sep. 27, 2019.

(51) Int. Cl.
*B62H 3/02* (2006.01)
*G07F 17/10* (2006.01)
*A47B 81/00* (2006.01)

(52) U.S. Cl.
CPC .............. *B62H 3/02* (2013.01); *A47B 81/00* (2013.01); *G07F 17/10* (2013.01)

(58) Field of Classification Search
CPC ... B62H 3/02; B62H 3/08; B62H 3/04; B62H 3/12; B62H 5/003; Y10T 70/5872; Y10T 70/5876; Y10T 70/5881; G07F 17/10; A47B 81/00; B62K 3/002
See application file for complete search history.

(56) References Cited

U.S. PATENT DOCUMENTS

| | | | |
|---|---|---|---|
| 2,070,254 | A | 2/1937 | Burgner |
| 2,958,422 | A | 11/1960 | Caloiero et al. |
| 2,974,804 | A | 3/1961 | Maro |
| D232,790 | S | 9/1974 | Kalnius |
| 3,841,119 | A | 10/1974 | Kaufmann |

(Continued)

FOREIGN PATENT DOCUMENTS

| | | |
|---|---|---|
| DE | 202019003436 U1 | 10/2019 |
| EP | 2937268 A1 | 10/2015 |

*Primary Examiner* — Ko H Chan
(74) *Attorney, Agent, or Firm* — McAndrews, Held & Malloy, Ltd.

(57) ABSTRACT

A rack for scooters is disclosed. The rack generally includes a base portion and a rack plate mounted to the base portion. The rack plate may include a top plate that is generally parallel to the ground and a front plate extending downward from the top plate. The top plate may include a plurality of slots, each of which is configured to receive a neck portion of a scooter. Each of the slots may be configured to support a scooter in an upright position when the scooter is placed therein. The slots may be tapered, allowing for scooters of varying designs to be supported therein. The rack plate may also include one or more apertures configured to receive a portion of a locking mechanism, such that the locking mechanism can be used to secure a scooter within a slot to prevent theft.

14 Claims, 10 Drawing Sheets

(56) References Cited

U.S. PATENT DOCUMENTS

| | | | |
|---|---|---|---|
| 3,918,279 A | | 11/1975 | Williamson |
| 4,128,354 A | * | 12/1978 | Amrogowicz ............ F16B 7/22 |
| | | | 312/265.5 |
| 5,738,229 A | | 4/1998 | Fairweather |
| 5,803,655 A | * | 9/1998 | Furuya .................... E05B 13/00 |
| | | | 403/321 |
| 6,045,097 A | | 4/2000 | Gaffar |
| 6,179,135 B1 | | 1/2001 | Simpson |
| 6,510,953 B2 | | 1/2003 | Daniels |
| D488,106 S | | 4/2004 | Birkmann et al. |
| 6,910,592 B1 | | 6/2005 | Lindenmeyer |
| D537,771 S | | 3/2007 | Pflieger |
| 8,429,941 B2 | | 4/2013 | Johannes Kooijmans |
| 9,370,277 B2 | | 6/2016 | Weaver |
| 9,597,791 B2 | | 3/2017 | Neal |
| 9,834,960 B2 | | 12/2017 | Chesterton et al. |
| D841,523 S | | 2/2019 | Ford |
| 2007/0040087 A1 | | 2/2007 | Barron |
| 2008/0223800 A1 | | 9/2008 | Cole |
| 2020/0361328 A1 | * | 11/2020 | Moravick ............... B60L 53/36 |

\* cited by examiner

SCOOTER RACK

This application is a continuation of U.S. patent application Ser. No. 17/032,896, filed on Sep. 25, 2020, which claims priority to U.S. Provisional Patent Application No. 62/907,263, filed on Sep. 27, 2019, the entireties of which are incorporated by reference herein.

BACKGROUND

Scooters, and in particular electric scooters (or "e-scooters"), are an increasingly popular mobility option for people to use to get around and commute, particularly in crowded urban areas. Indeed, many companies, such as Lime, Spin, Uber, and Lyft, rent out or "share" scooters for use in cities. One side effect of this increased popularity of scooter sharing is that, when people are done using a scooter, they just abandon it on a sidewalk or other public area for the next user to pick up and use. This can lead to an unsightly pile-up of scooters in publicly available areas in cities, including downtown areas and neighborhoods. There is also a need for people who own their own personal scooters to be able to dock and safely lock up their scooters in public areas when they are not using them.

Certain aspects of the present technology provide a docking station or rack, such as a public rack, for scooters.

SUMMARY

Certain aspects of the present technology provide a rack for scooters. The rack includes a base portion and a rack plate mounted to the base portion. The rack plate may include a top plate that is generally parallel to the ground and, optionally, a front plate extending downward from the top plate. The top plate includes a plurality of slots, each of which configured to receive a portion of a scooter such as a neck portion. In some embodiments, each slot may be a tapered slot, which provides for the stable upright docking of scooters having a variety of neck diameters.

In some embodiments, the slot may comprise a first portion, also referred to herein as a gap, that extends substantially perpendicular to a longitudinal axis of the top plate (which spans between a first end and a second end, the first and second ends being attached to first and second legs) and a second portion that extends substantially parallel with the longitudinal axis of the top plate. By substantially perpendicular to the longitudinal axis, it is meant that a user may move a scooter into the slot by wheeling the scooter in a generally forward direction and includes angles that are not exactly 90° with the longitudinal axis, but also other angles that allow for a scooter to be wheeled directly into the slot including, for example, angles within a range of 60° to 90°, optionally angles within a range of 70° to 90°, optionally angles within a range of 80° to 90°. By substantially parallel with the longitudinal axis, it is meant that after wheeling a scooter into the first portion of the slot as described above, the scooter may fall generally sideways into the second portion of the slot and be supported in an upright position (see, e.g., FIGS. 7-10) and includes angles that are not exactly 0° with the longitudinal axis, but also other angles that allow for a scooter to fall generally sideways into the second portion including, for example, angles within a range of 0° to 30°, optionally angles within a range of 0° to 20°, optionally angles within a range of 0° to 10°.

In some embodiments, the outer surface of the rack plate may be rubber. For instance, the outer surface of the rack plate may have a rubber coating, which may protect the scooters against scratches and other damage.

In some embodiments, the rack plate may also include one or more cutouts, i.e. apertures, each of which is configured to receive a portion of a locking mechanism, i.e. lock, such that the lock secures the scooter to the rack plate, and more specifically secures the scooter within the slot so that the scooter cannot be removed from the slot unless the lock is first removed. The one or more cutouts may be located in the top plate, the front plate, or a combination thereof. For instance, one or more of the cutouts may span between the top plate and the front plate, such that the cutout is located at least partly in the top plate and partly in the front plate. In some embodiments, the top plate may include a first cutout and the front plate may include a second cutout. In some embodiments, the top plate may include a first cutout and a second cutout.

In some embodiments, the rack plate includes one or more apertures associated with at least one of the plurality of slots, each of the one or more apertures being configured to receive a portion of a lock such that the lock secures the scooter within the slot. For instance, the one or more apertures associated with at least one of the plurality of slots may comprises a first aperture and a second aperture. The first and second apertures may be positioned on opposite sides of the slot, the first and second apertures together being configured to receive portions of a lock such that the lock secures a scooter within the slot.

In some embodiments, for instance, the first and second apertures may be positioned on opposite sides of the first portion of the slot, and the first and second apertures may together be configured to receive portions of a lock such that the lock secures a scooter within the slot. In other embodiments, the first aperture may be positioned to the rear of the second portion of the slot and the second aperture may be positioned to the front of the second portion of a slot, and the first and second apertures may together be configured to receive portions of a lock such that the lock secures a scooter within the slot.

In some embodiments, the one or more apertures associated with at least one of the plurality of slots comprises first, second, and third apertures. The first and second apertures may be positioned on opposite sides of the first portion of the slot, and the first and second apertures may together be configured to receive portions of a lock such that the lock secures a scooter within the slot in a first manner. The first and third apertures may be positioned on opposite sides of the second portion of the slot, and the first and third apertures may together be configured to receive portions of a lock such that the lock secures a scooter within the slot in a second manner. The lock used to secure the scooter within the slot in a first manner may be the same or different from the lock used to secure the scooter within the slot in a second manner. For instance, a conventional bicycle U-lock may be used to secure the scooter within the slot in a first manner, whereas a conventional chain lock may be used to secure the scooter within the slot in a second manner. Alternatively, for example, a conventional bicycle U-lock or chain lock may be used to secure the scooter within the slot in either the first or second manner and a conventional padlock may be used to secure the scooter within the slot in the first manner. In this way, embodiments of the rack disclosed herein may provide a user with a plurality of options for locking a scooter using a variety of conventional locking mechanisms.

The base portion may include two legs each of which may be mounted at an opposite end of the rack plate. Each of the two legs may include a lower portion and an upper portion, wherein the upper portion may extend upward from the lower portion at an acute angle. The bottom portions may include holes for receiving fasteners that anchor the rack to the ground.

Figure 1:
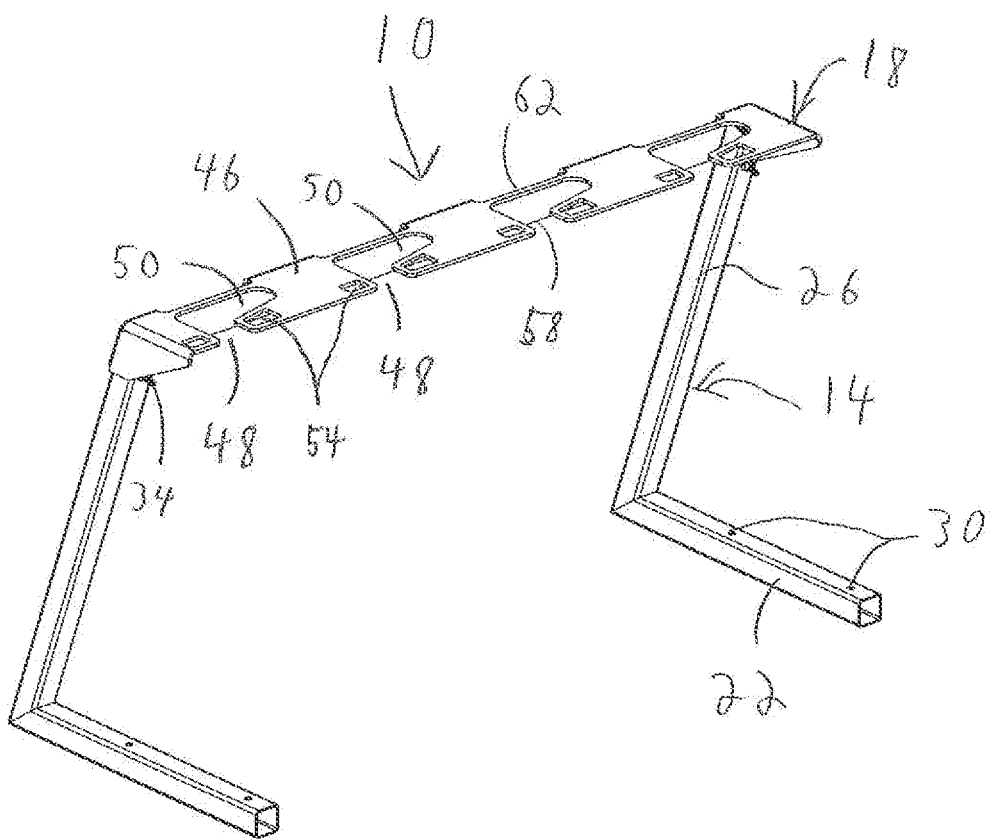
FIG. 1 illustrates a rear isometric view of a scooter rack according to an embodiment of the technology.
Figure 2:
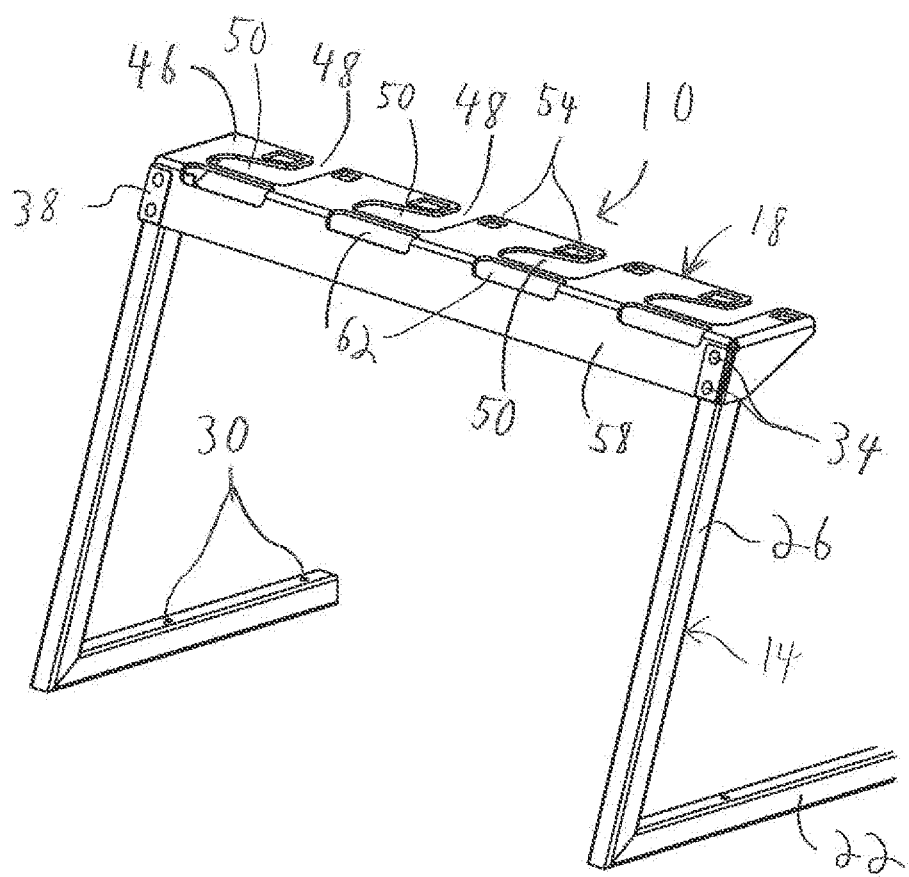
FIG. 2 illustrates a front isometric view of the scooter rack of FIG. 1.
Figure 3:
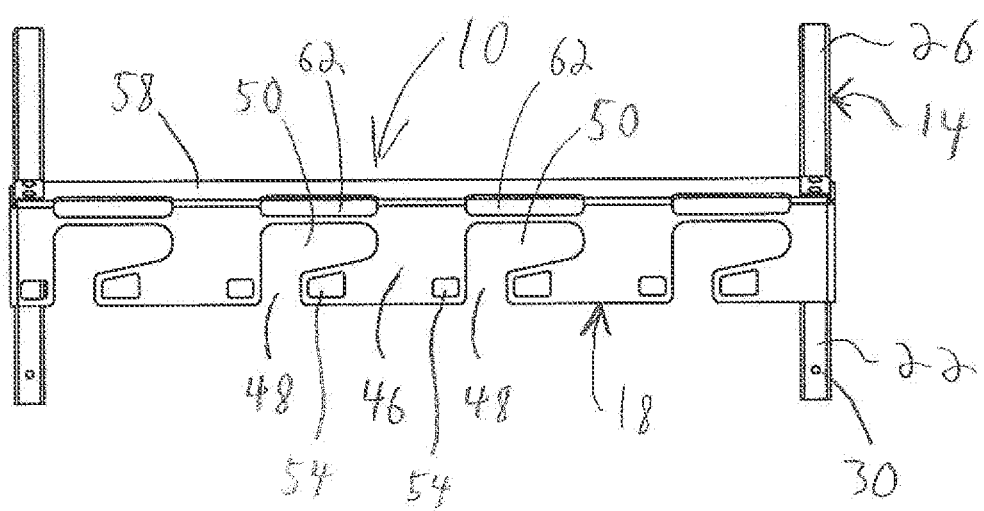
FIG. 3 illustrates a top view of the scooter rack of Figure.
Figure 4:
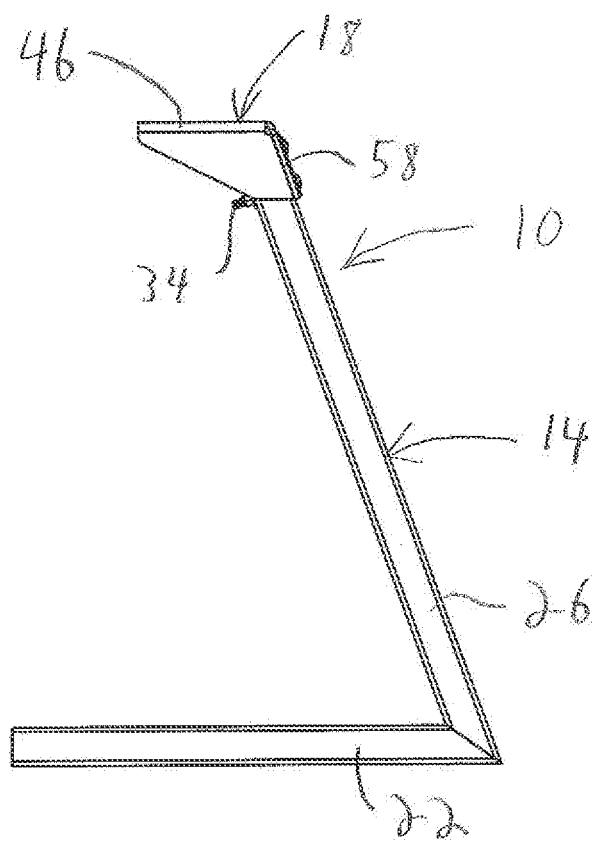
FIG. 4 illustrates a side view of the scooter rack of FIG. 1.
Figure 5:
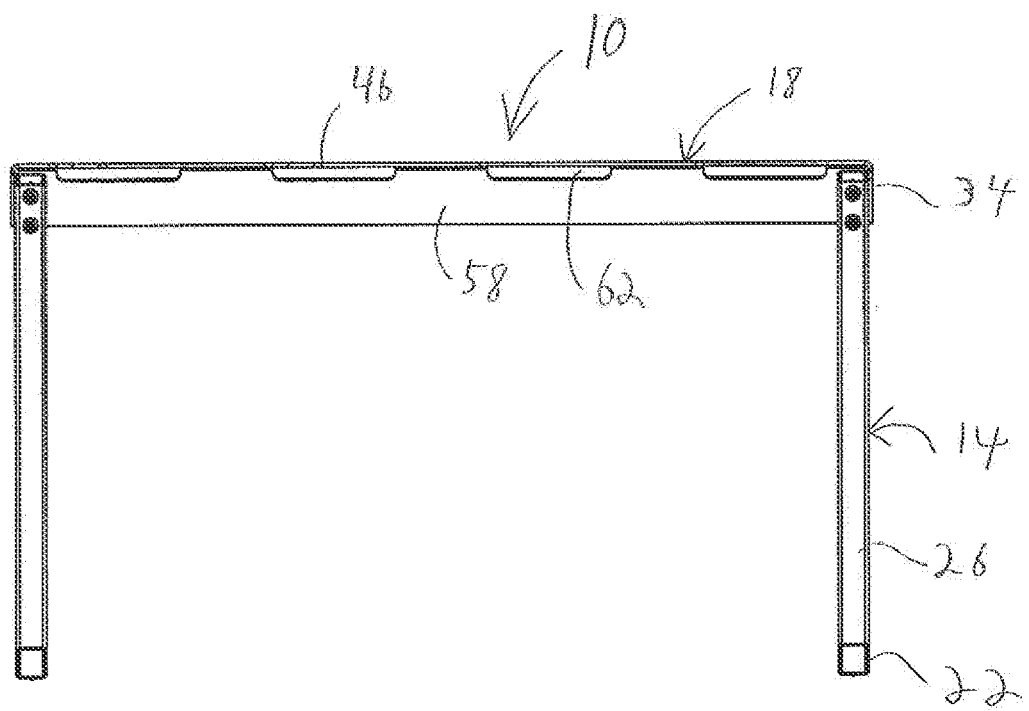
FIG. 5 illustrates a rear view of the scooter rack of FIG. 1.

Before the embodiments of the present technology are explained in detail, it is to be understood that the technology is not limited in its application to the details of construction and the arrangement of the components set forth in the following description or illustrated in the drawings. The technology is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

The presently disclosed technology relates generally to a rack or docking station for scooters and, in particular, e-scooters.

Figure 6:
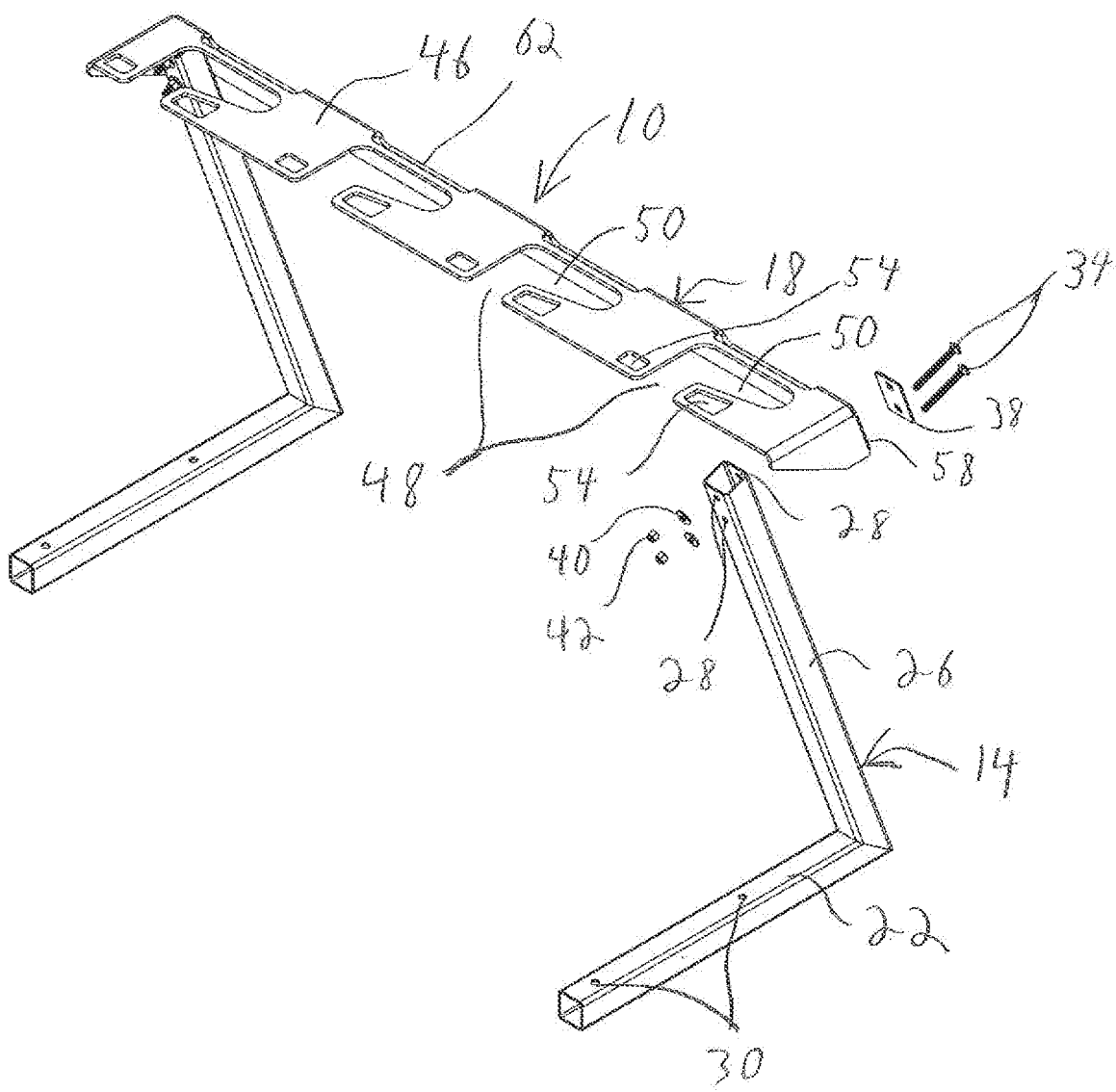
FIG. 6 illustrates an exploded rear isometric view of the scooter rack of FIG. 1.
Figure 7:
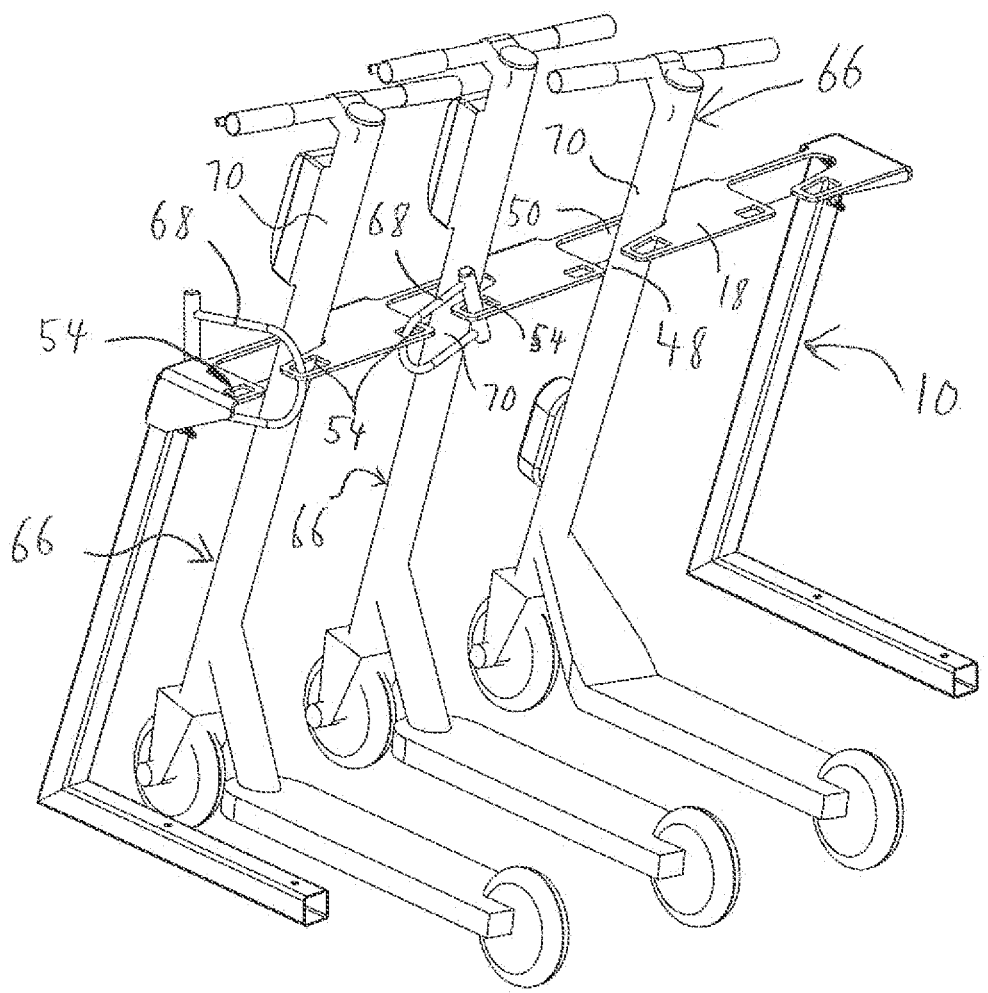
FIG. 7 illustrates a rear isometric view of the scooter rack of FIG. 1 with scooters docked in the rack.
Figure 8:
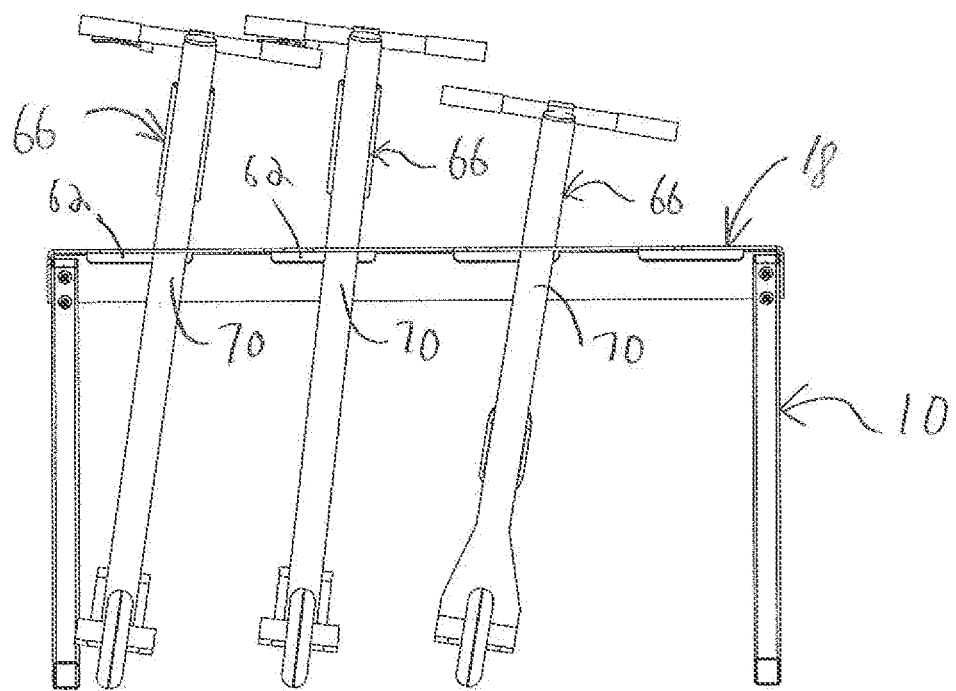
FIG. 8 illustrates a rear view of the scooter rack and scooters of FIG. 7.
Figure 9:
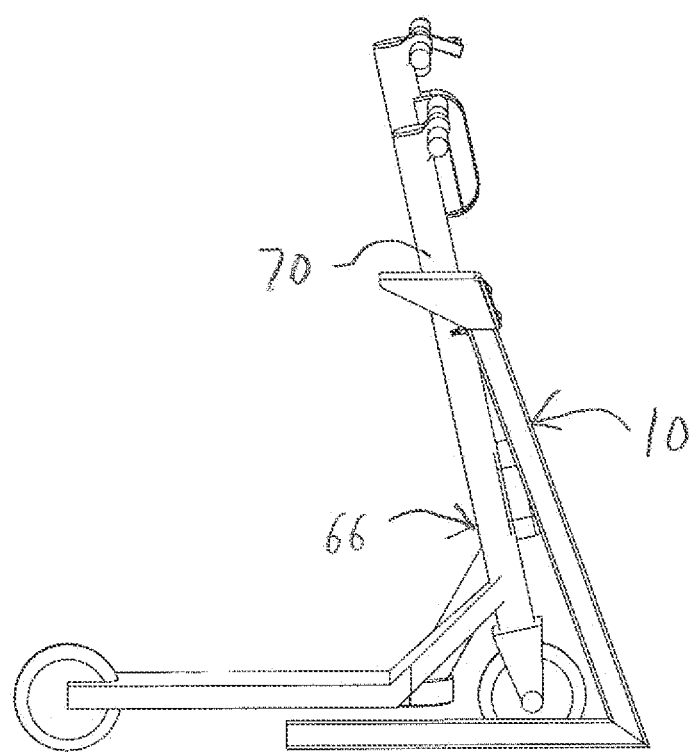
FIG. 9 illustrates a side view of the scooter rack and scooters of FIG. 7.
Figure 10:
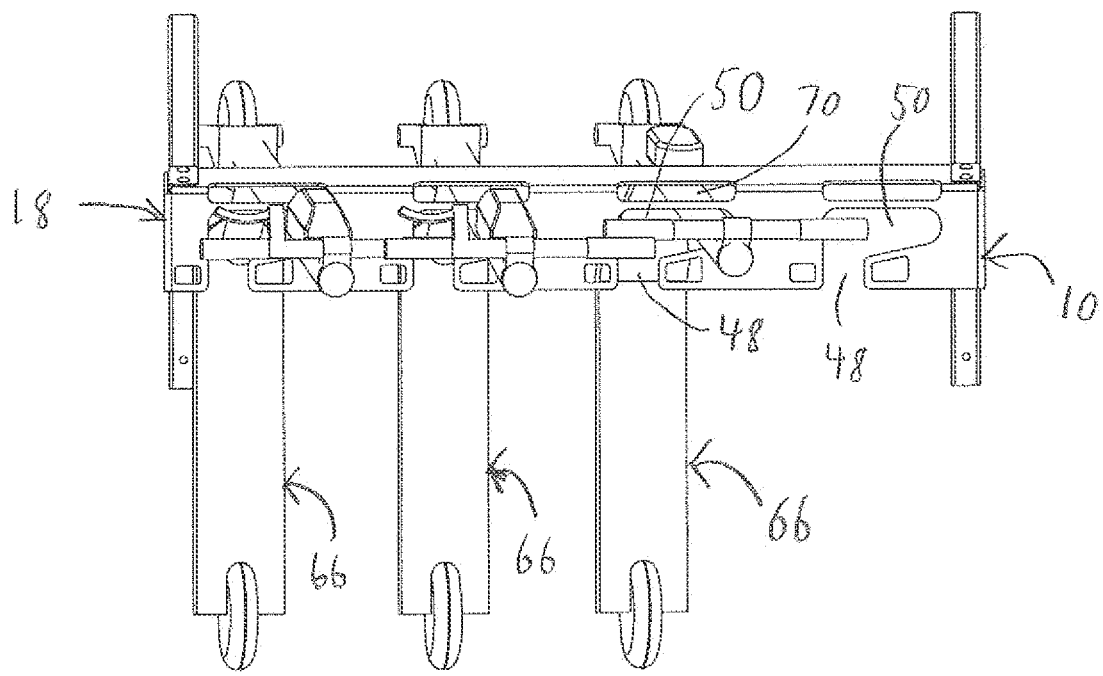
FIG. 10 illustrates a top view of the scooter rack and scooters of FIG. 7.

FIGS. 1-6 illustrate various views of a scooter rack 10. The rack 10 includes rack legs 14 and a rack plate 18 mounted to the rack legs 14. The legs 14 form a base portion for the rack 10, and each leg 14 has a lower portion 22 and an upper portion 26 wherein the upper portion 26 extends upward from the lower portion 22 at an angle. By way of example only, the angle is an acute angle. The lower portion 22 is configured to be positioned on the ground and includes holes 30 that are configured to receive anchors (such as bolts or screws) that can be used to secure the lower portion 22 to the ground. With reference to FIG. 6, the upper portions 26 include holes 28 for receiving fasteners to connect the rack plate 18 to the upper portions 26. The lower portion 22 and upper portion 26 can be formed integrally with each other or can be connected by welding or any number of other ways. Alternatively, the lower portion 22 and the upper portion 26 can be detachably connected to each other. By way of example, the legs 14 are made of hollow square metal tubes (such as a two inch tube frame, for example) but may be made of any number of other suitable materials that are sturdy and robust.

The rack plate 18 is positioned on top of the upper portions 26 of the legs 14. By way of example only, the rack plate 18 may be made of metal plate that is approximately 0.25 inches thick and that has been dipped in rubber such that the exterior of the plate 18 is rubberized. Alternatively, the plate 18 may be made of other materials and/or have different dimensions. The rack plate 18 includes a top plate 46 that includes gaps 48 that lead to tapered slots 50 in the top plate 46. The tapered slots 50 are generally perpendicular to the gaps 48 so that a gap 48 and slot 50 form an "L-shaped" slots, and the gaps 48 and slots 50, and thus the L-shaped slot, are sized to receive the neck portion of a scooter. The top plate 46 also may include one or more cutouts 54 located proximate the slots 50. The cutouts 54 are smaller than the slots 50 but are sized and configured to receive components of locking mechanisms, such as conventional bicycle U-locks, chain/cable locks, padlocks, or the like.

The rack plate 18 also includes a front plate 58 that is connected to the top plate 46 and that extends downwardly from the top plate 46 at an obtuse angle. The front plate 58 may be integrally formed with the top plate 46 or welded to the top plate 46 or connected to the top plate 46 by any number of other means. Alternatively, the front plate 58 and top plate 46 may be separate components. The rack plate 18 may include elongated cutouts 62 at various points along where the top plate 46 and front plate 58 interconnect. Alternatively, the cutouts 62 can be located entirely in the front plate 58. The cutouts 62 are aligned with and are in front of and below the tapered slots 50 that are located in the top plate 46. The elongated cutouts 62 are sized and configured to receive components of locking mechanisms, such as conventional bicycle U-locks or chain/cable locks, or the like.

The rack plate 18 is secured to the legs 14 by fasteners 34 (such as bolts, for example) that extend through holes (not shown) in the front plate 58 and the holes 28 in the upper portions 26. The fasteners 34 are held in place by plates 38 that engage the front plate 58 and washers 40 and nuts 42 that engage the upper portions 26 of the legs 14. By allowing for assembly of the rack 10 by bolting together the rack plate 18 and the legs 14, the rack 10 can be shipped as separate components in less bulky, flat packaging.

FIGS. 7-10 show the rack 10 with scooters 66 docked in the rack 10. As can be seen, the "L-shaped" slots formed by the gaps 48 and slots 50 allow for the necks of the scooters to be slidably received into and secured in the top plate 46 of the rack 18. That is, the neck 70 of a scooters 66 can be positioned through the gap 48, and then the upright scooter neck can be allowed to fall into the tapered slot 50 adjoining the gap 48. Because the width of each slot 50 tapers down from its opening (which meets the gap 48), the slots 50 are configured to slidably receive scooter necks 70 of different sizes, with each neck 70 being slidably received in a slot 50 until the neck 70 cannot slide any further within the slot 50. In this way, the slots 50 hold the necks 70, and thus the scooters 66, in place. Accordingly, the "L-shaped" slots are configured to receive, hold, and securely retain any size of scooter. The rubberized exterior of the rack plate 18 helps protect the necks 70 from being scratched or damaged and helps grip and hold the necks 70 in place. Moreover, the use of the tapered slots 50 eliminates the need for use of kickstands for the scooters 66 because the scooters 66 are held upright by virtue of the fact that the necks 70 are held in place in the slots 50. In addition, as can been seen in FIG. 7, the scooters 66 can be secured in the rack 10 by extending portions of locking mechanisms 68 (such a u-locks or cable locks) around the necks 70 and through the cutouts 54 and/or elongated cutouts 62. The cutouts 54 and elongated cutouts 62 provide that the rack 10 can accommodate a variety of different types of scooters and locks.

In some embodiments, the rack 10 may include a charger or charging station (not shown) that can be used to charge the scooters 66. The charger/charging station may include a power source, e.g. a battery, a generator, etc., and a plurality of plugs, each of which may be connected to a scooter once the scooter has been placed within one of the plurality of slots. In some embodiments, the rack 10 may comprise one or more solar energy panels (e.g. which can be located on the top surface of the rack plate 18 or which may extend above the rack) and/or a small wind energy turbine (which would extend above the rack), and may utilize that renewable energy source to generate energy and charge the scooters. Moreover, in some embodiments, the plugs may be excluded and the scooter may be charged by wireless charging. For instance, in some embodiments, at least one of the slots of the rack plate may be configured to provide wireless charging when a neck of a scooter is placed within the slot.

The rack 10 may also include an additional plate mounted to the rack plate 18 and/or the legs 14 on which branding, artwork, words, indicia, etc. can be placed, etched, or removably attached. For example, the plate could extend downward from the front plate 58 and include branding, artwork, words, etc. on either or both sides of the plate. Alternatively or additionally, branding, artwork, words, indicia, etc. can be placed on portions of the rack plate 18 and/or the legs 14.

Thus, the rack 10 provides a public docking station for scooters 66 that is easy to ship and assemble and that is made of robust components that can withstand wear and tear yet secure and not scratch scooters 66. In addition, due to the tapered nature of the slots 50, the rack 10 can be used to dock a variety of different kinds of scooter 66. Furthermore, due to its unique shape and structure, the rack 10 does not require a front wheel catch component along its bottom for stability and/or for securing scooters in place. However, in an alternative embodiment, a front wheel catch or other structure that can provide additional means to stabilize the scooters could be added to the rack 10. In addition, the rack may be configured so that any of a variety of conventional bike or scooter locks 68 can be used to secure a scooter 66 to the rack 10.

In some embodiments, the rack 10 may be configured so that one or more bicycles may be maintained in an upright position, and secured to the rack through any of a variety of conventional bike locks 68, in addition to scooters. For instance, in some embodiments, the slots 50 may be configured so that a portion of a bicycle frame, such as bicycle frame a head tube, may be received therein. Given the differences between scooter wheels and bicycle tires, the lack of a wheel catch component of the rack 10 is an important feature in these multi-purpose rack embodiments. By providing racks 10 that allow users to park and secure scooters or bicycles in any of the slots, the racks 10 of embodiments of the present disclosure may consolidate parking structures for personal and/or community-shared transportation devices. For instance, in some embodiments, the rack 10 may be configured to support and secure a plurality of user-owned scooters and bicycles. In other embodiments, the rack 10 may be configured to support and secure a plurality of scooters and bicycles, both of which are associated with a community sharing program.

The rack 10 may also be configured so that multiple racks may be secured together to form a larger rack, i.e. the rack may be modular. For instance, the sides of the legs 14 and/or the sides of the rack plates 18 may comprise one or more attachment members (e.g. clips, etc.) and/or openings configured to receive fasteners, by which the legs and/or plates of a first rack could be secured with those of a second rack.

While various spatial and directional terms, such as top, bottom, lower, mid, lateral, horizontal, vertical, front and the like may used to describe embodiments of the present technology, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present technology. It is understood that the technology disclosed and defined herein extends to all alternative combinations of two or more of the individual features mentioned or evident from the text and/or drawings. All of these different combinations constitute various alternative aspects of the present technology. The embodiments described herein explain the best modes known for practicing the technology and will enable others skilled in the art to utilize the technology. The claims are to be construed to include alternative embodiments to the extent permitted by the prior art.

Various features of the invention(s) are set forth in the following claims.

The invention claimed is:

1. A rack for scooters, comprising:
a base portion; and
a rack plate mounted to the base portion, the rack plate comprising a top plate that is generally parallel to the ground and a front plate extending downward from the top plate,
wherein the top plate includes a plurality of slots, each of which is configured to receive a neck portion of a scooter, and
wherein the at least one of the plurality of slots comprises a first portion that extends substantially perpendicular to a longitudinal axis of the top plate and a second portion that extends substantially parallel with the longitudinal axis of the top plate;
wherein the rack plate includes one or more apertures associated with at least one of the plurality of slots, each of the one or more apertures being configured to receive a portion of a lock such that the lock secures the scooter within the slot; and
wherein the one or more apertures associated with at least one of the plurality of slots comprises a first aperture and a second aperture and wherein the first and second apertures are positioned on opposite sides of the second portion of the slot and the first aperture is positioned in the front plate.

2. The rack of claim 1, wherein the second portion has a width that decreases at increasing distance from the first portion for the entire length of the second portion.

3. The rack of claim 1, wherein the outer surface of the top plate is rubber.

4. The rack of claim 1, wherein the base portion includes a first leg attached to a first end of the rack plate and a second leg attached to a second end of the rack plate.

5. The rack of claim 4, wherein each of the first and second legs comprises one or more openings configured to receive fasteners to anchor the rack to the ground.

6. The rack of claim 4, wherein each of the first and second legs includes a lower portion and an upper portion, the upper portion extending upward from the lower portion at an acute angle.

7. The rack of claim 6, wherein the front plate extends downward from the top plate at an obtuse angle.

8. The rack of claim 4, wherein each of the first and second legs is made of hollow square metal tubes.

9. The rack of claim 1, wherein the rack does not have a front wheel catch component.

10. The rack of claim 9, wherein the slots are also configured to receive a portion of a bicycle frame.

11. The rack of claim 1, further comprising a charger configured to provide a scooter with an electric charge.

12. The rack of claim 11, further comprising a solar energy panel, a wind energy turbine, or both.

13. The rack of claim 11, wherein the charger is a wireless charger.

14. The rack of claim 13, wherein the charger is associated with at least one of the slots, so that a scooter may be charged by being placed within the slot.

\* \* \* \* \*